A. E. SPINASSE.
GLASS WORKING APPARATUS.
APPLICATION FILED OCT. 30, 1909.
1,166,794.
Patented Jan. 4, 1916.
2 SHEETS—SHEET 2.
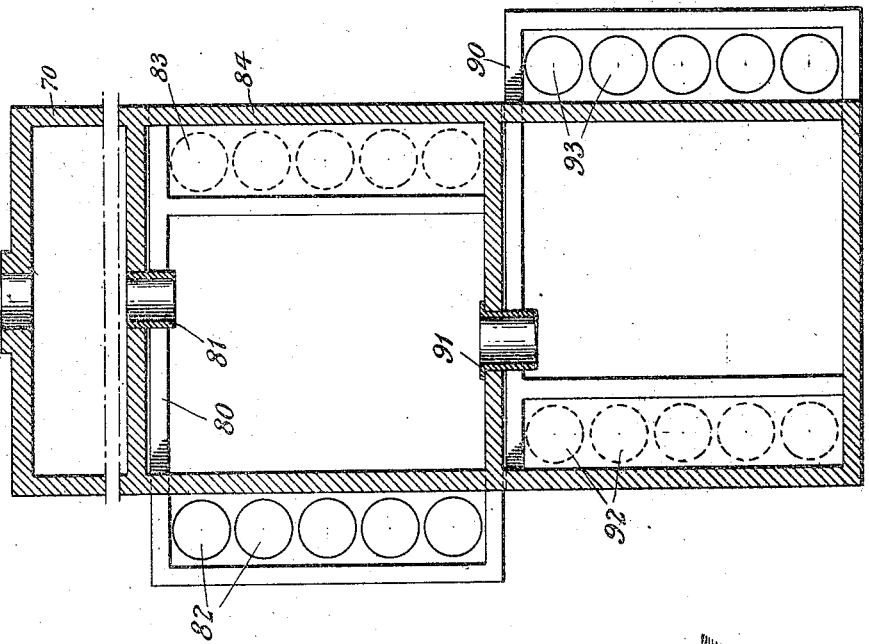
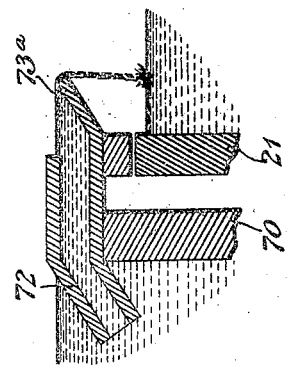
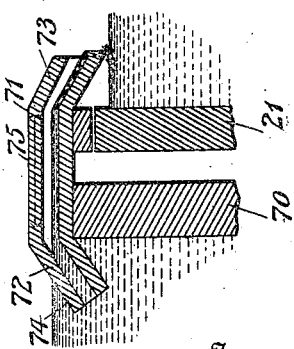
Inventor
Arthur E. Spinasse
By his Attorneys
Kerr, Page, Cooper and Hayward
Witnesses:

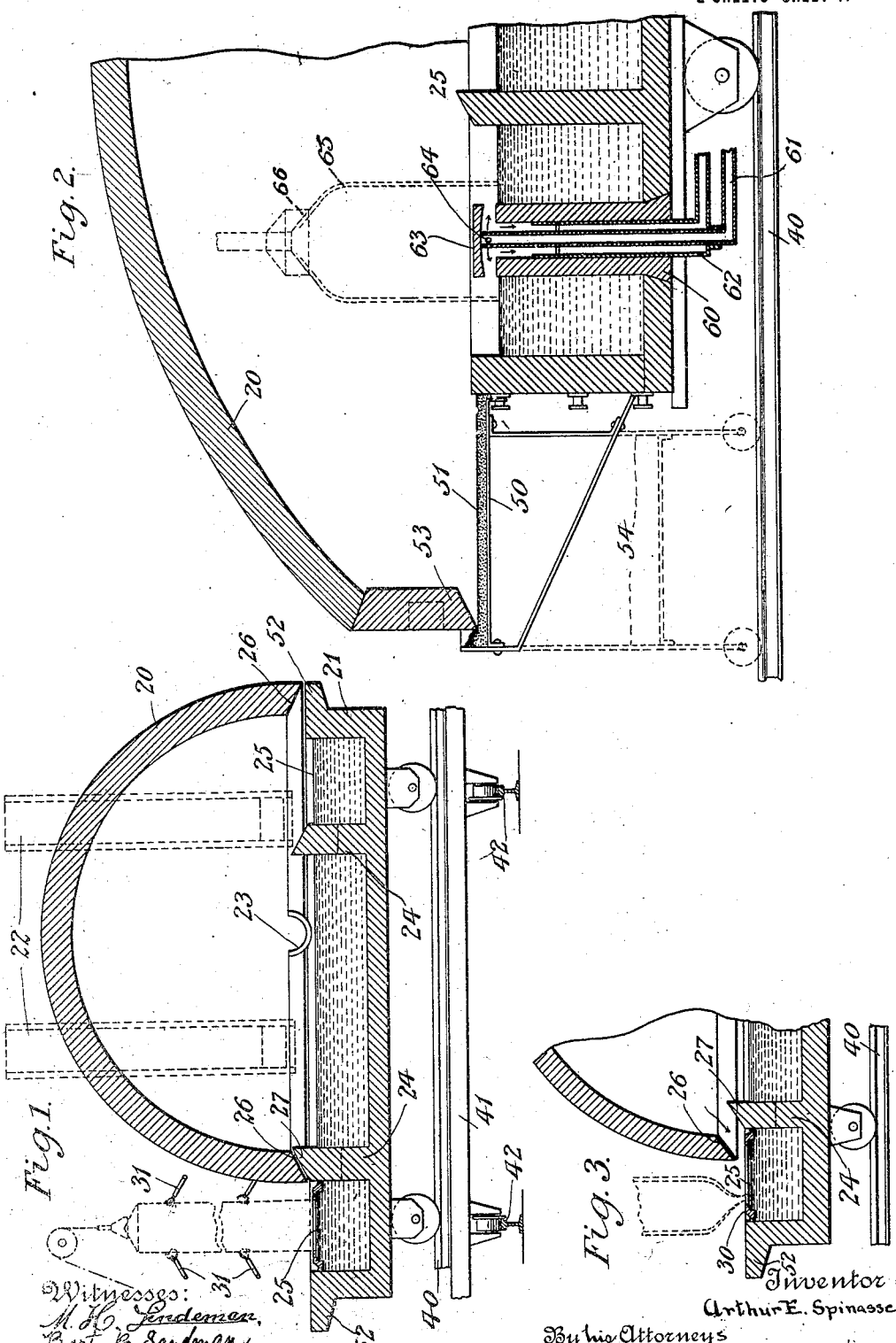

UNITED STATES PATENT OFFICE.

ARTHUR E. SPINASSE, OF MOUNT VERNON, OHIO, ASSIGNOR TO PITTSBURGH PLATE GLASS COMPANY, OF PITTSBURGH, PENNSYLVANIA, A CORPORATION OF PENNSYLVANIA.

GLASS-WORKING APPARATUS.

1,166,794.  Specification of Letters Patent. Patented Jan. 4, 1916.

Application filed October 30, 1909. Serial No. 525,428.

*To all whom it may concern:*

Be it known that I, ARTHUR E. SPINASSE, a citizen of the United States, residing at Mount Vernon, in the county of Knox and State of Ohio, have invented certain new and useful Improvements in Glass-Working Apparatus, of which the following is a full, clear, and exact description.

My invention relates to improvements in glass working apparatus and has particular reference to the source of drawing to which I have imparted desirable accessory features to further the ultimate production of a superior product.

One feature of importance in my invention arises from the provision of walls, for a relatively movable tank and hood, whose edges are mitered. From this construction many advantages arise and some of these will appear hereinafter.

Another feature of importance in my invention consists in the provision of a sealing element between the relatively movable hood and tank which may vary its superficial contour to compensate for irregularities in the meeting edges of the tank and hood. The substance of this variable medium, under preferred conditions, is sand or other granular material and it may be noted that the danger of cracking which is ever-prevalent in the use of refractory material is obviated with such a sealing shelf.

My invention further contemplates the provision of an improved means for transferring molten glass from a supply tank to a delivery tank. The advantage of this means will appear when it is considered that pure undisturbed glass may be secured and delivered with practically no danger of material loss of glass in the event of accident to the delivery element.

Other features of material improvement will appear, such as a means for presenting a drawing surface of one tank to a workman while the drawing surface of an adjacent tank is being subjected to a reducing heat in preparation for use while the first drawing surface is withdrawn into a zone of reducing heat.

Various other features of value and importance will appear as the description progresses.

With these and other incidental objects in view, the invention consists in certain novel combinations of parts, a preferred form of embodiment of which is shown in the accompanying drawings forming part of this specification.

In said drawings Fig. 1 represents a sectionalized view showing the hood and movable tank for containing the molten glass; Fig. 2 shows a portion of the hood and tank with certain of the above enumerated improvements added thereto; Fig. 3 represents a detailed sectional view of a portion of the tank and hood and of the ring or float; Figs. 4 and 5 show sectionalized views of the spout connecting the supply tank to the delivery tank, and Fig. 6 shows a horizontal section through a hood having a duplex arrangement of movable tanks.

The general form of apparatus comprising the hood and movable tank is similar to that which is shown and described in my Patent No. 921,747 issued May 18, 1909, but it is to be understood that certain of these improvements are applicable to other forms of glass working apparatus, and that certain features are likewise applicable to any arrangement in which there is relative movement between the hood and the tank. Reference may be had to said patent for a description of a general operation of a glass working apparatus having a movable tank of the sort referred to.

Referring now to the drawings above described, in Fig. 1 the stationary hood 20 surmounts the movable tank 21. The hood is semi-cylindrical in shape, and is suitably constructed to confine the heat therein so as to heat the body of glass within the tank. The heat flues 22 supply heat to the interior of the hood. If desired, the hood may surmount a stationary supply tank containing molten glass, and delivering said molten glass by means of a connecting spout 23 to the movable tank 21.

The tank 21 is divided into compartments by walls 24 which are suitably apertured to permit the molten glass to flow freely from the middle compartment to the outside or drawing compartments 25. In Fig. 1 the tank is shown shifted to the left so as to expose the lefthand compartment 25, and a cylinder of glass is shown in dotted lines in the process of being lifted or drawn from this compartment.

The lower edges of the hood 20 are inclined downwardly, as at 26, and the walls 24 are given a corresponding inclination 27 so that when the tank is partly shifted to the right, as shown in Fig. 3, the heat from the interior of the hood may rush out between the inclined walls 26 and 27 and be deflected downward upon the surface of the molten glass, and upon the junction of the drawn cylinder therewith, so as to supply additional heat to the cylinder at this point and thus assist in the operation of severing the glass cylinder from the mass.

The ring or float 30 shown on the surface of the glass in compartment 25 in Figs. 1 and 3, may assist in this operation of constructing the lower end of the glass cylinder as just referred to, in that the movement of the tank to the right draws the float 30 against the side of the glass cylinder and assists in the collapse of the same.

As shown in Fig. 1, the glass cylinder in being drawn is surrounded by several burners 31 which are suitably mounted and arranged to be shifted in direction so as to correct any imperfections in the glass as the cylinder is drawn.

Referring again to the laterally movable tank 21, it will be seen in Fig. 1 that this tank is mounted on rollers or wheels so as to travel upon a track 40 carried upon a frame 41, which in turn has rollers traveling upon a track 42 at right angles to the track 40 so that thereby the laterally shifting tank can be moved transversely to its own path of travel and out from under the hood by means of the track 42.

In Fig. 2 the hood is shown of slightly different shape, being somewhat more flattened, and the movable tank is shown provided with an extension flange or shelf 50. On the surface of this shelf 50 there is spread a covering or layer of non-conducting material in granular or pulverulent form, such as sand 51. This shelf performs the function of the flanges 52 shown in Fig. 1, in that when the tank is shifted laterally so as to expose one compartment or the other, the contact of the lower portion 53 of the hood with the sand on this shelf prevents the escape of heat from the interior of the hood. It will of course be understood, as described in my aforesaid patent, that the tank is shifted from one side to the other, the drawing operations being performed alternately so as to heat the glass in one compartment, while the other compartment is exposed for drawing.

It will be understood that this shelf 50, just above described, could be utilized in other forms of construction where there is relative movement between the hood and the tank, such for example as where the tank is stationary and the hood is movable; or the shelf itself might be supported upon an independent truck 54, as shown in dotted lines in Fig. 2.

There is also shown in Fig. 2 a novel means of drawing air into the interior of the bait or cylinder after the drawing operation has begun. In this case the chamber 25 has a central tube 60 formed therein, and up through this tube there extend two pipes 61 and 62, the former being telescoped within the latter. At the top of the pipe 61 there is an air deflecting plate 63, and there are apertures 64 formed in the pipe 61 just below this plate so as to permit the flow of air therethrough.

By the use of the usual air suction and air compression apparatus these pipes may be used to supply air to or withdraw it from within the glass cylinder 65, shown in dotted lines in Fig. 2, after the bait 66 has been brought down in contact with the glass and the glass cylinder raised. (This bait would of course be used outside the hood). For example, pipe 61 may be used to supply air to the interior of the cylinder, and the pipe 62 may be used for a suction pipe to withdraw air from the cylinder, the direction of the air flow being shown by the arrows in Fig. 2. These pipes are to have flexible connecting pipes to permit the movement of the tank.

When the bait is first brought in contact with the surface of the molten glass, the said tube 60 and deflecting plate 63 being inclosed within the interior of the bait in that position, the air suction through the pipe 62 may be utilized to raise the glass within the bait, and then the pipe 61 to force air into the cylinder and keep the cylinder at the desired shape.

It will be seen that this deflecting plate 63 serves to deflect the incoming air current to the source of drawing, that is, the junction between the upper surface of the molten glass and the cylinder.

This arrangement possesses the great advantage of enabling the operator to control the air pressure within the bait and cylinder by means of these air tubes entirely independently of any air tubes through the bait itself, and the deflecting plate serves to control this air at the junction point above referred to.

Referring now to Figs. 4 and 5, I have shown therein two forms of delivery spouts for connecting the supply tank 70 to the aforesaid movable tank 21.

The spout 71 shown in Fig. 4 is inclined downward at 72, this being the end which projects downward into the molten glass in the supply tank 70. The other end 73 likewise is inclined downward so as to deliver the glass to a point near the surface of the glass within the movable tank. This downward inclination of the spout within the supply tank prevents the delivery of impurities from the supply tank into the working tank or movable tank 21. Such impurities will lodge themselves above the projecting mouth of the spout at the point 74 in Fig. 6, and from there they may be skimmed off in any suitable manner. The pure glass below will therefore take its course through the spout and will be smoothly delivered close to the surface of the metal in the working tank. If desired, an opening 75 may be provided in the spout to deliver heat to the surface of the glass in its course through the spout.

Another advantage of this particular form of spout is that the surface of the glass through the spout is but slightly raised above the outside retaining wall of the supply tank so that in the event of breakage of the tank only a small quantity could overflow. This form of spout has the double advantage of avoiding surface impurities of the glass, and at the same time having the level of flow rest only slightly above the level of the retaining wall of the tank; that is, that portion of the wall within which the spout is situated.

In Fig. 5 a similar form of spout is shown having a downwardly projecting portion 72, but in this case the delivery end of the spout 73ª has its lower wall inclined upward, and its upper wall broken away so that the molten glass is above this delivery spout 73ª.

In Fig. 6 I have shown a duplex arrangement of tanks in which there are two movable working tanks arranged to be alternately exposed at opposite sides. The first tank 80 is adjacent to the supply tank 70 and connected therewith by a spout 81 which delivers the molten glass into the tank 80. The tank may be shifted to the lefthand to expose the compartments 82 while the compartments 83 are being heated beneath the hood 84, or the tank may be shifted to the righthand so as to reverse these positions and expose the drawing compartments 83.

Connected with the movable tank 80 is a second delivery spout 91 which communicates with the second movable tank 90, so that there is a successive flow of molten glass from the supply tank to the tank 80 and then to the tank 90. The tank 90 has likewise two sets of compartments, namely, 92 on the left and 93 on the right, so as to be alternately exposed.

In this arrangement the tanks are oppositely shifted so that at first the compartments 82 of the first tank are exposed on the left and compartments 93 of the second tank on the right, and then on the shifting of the tanks, after the drawing operation has taken place from both sets of compartments, the first tank has the compartments 83 exposed and the second tank the compartments 92 exposed. This makes it possible to have one set of workmen constantly remain on the one side of the duplex arrangement of tanks, first operating one tank and then the other and another set on the opposite side of the tank operating similarly, thus avoiding traveling from one side of the tank to the other for the successive operations, and avoiding the delay of waiting on one side or the other.

What is claimed is:

1. In a glass working apparatus, the combination with a tank, of a hood, said tank and hood being relatively movable, partitions in said tank forming a main and drawing compartments, said partitions being extended upward to overlap the end walls of said hood when in certain positions of adjustment.

2. In a glass working apparatus, the combination with a tank, of a hood, said tank and hood being relatively movable, partitions in said tank forming a main and drawing tanks, said partitions being extended upwardly and mitered, the walls of said hood having their edges mitered to overlap said mitered partitions.

3. In a glass working apparatus, the combination with a tank having a main and drawing compartments, of a hood, said tank and hood being relatively movable to alternately expose said drawing compartments, inclined edges on the walls of said hood, and complemental overlapping inclined terminations for directing heat from within said hood downwardly into said drawing compartments.

4. In a glass working apparatus, the combination with a tank having a plurality of drawing compartments, a hood, and means constructed to provide for relative movement between the tank and the hood to expose said compartments; the engaging walls of said hood and said tank being constructed with inclined surfaces to deflect the flow of heat toward the surface of the glass within the compartment when the tank and hood are separated.

5. In a glass working apparatus, the combination with a laterally movable tank having dividing walls separating the tank into drawing compartments, of a hood surmounting said tank; means constructed to provide for the lateral movement of the tank beneath the hood to expose said drawing compartments in turn; the engaging walls of said hood and said tank dividing walls having inclined surfaces directed downward to deflect the flow of heat toward the surface of the glass within the compartment when said walls are separated.

6. In glass working apparatus, a glass receptacle comprising a hood and tank relatively movable and each having coacting walls with mitered edges.

7. In a glass working apparatus, a glass receptacle comprising a hood and tank relatively movable and a sealing connection between the relatively movable edges of a nature to conform to variations of outline of the edges.

8. In a glass working apparatus, the combination with a tank having a drawing compartment, a hood and means constructed to provide for relative movement between the tank and the hood to expose said compartment for drawing; of a shelf movable in juxtaposition to the said drawing compartment and the lower wall of said hood, said shelf being provided with a granular substance engaging with said hood wall and serving to obstruct the flow of heat between said hood wall and said tank.

9. In a glass working apparatus, the combination with a laterally movable tank provided with a drawing compartment, of a hood surmounting said tank, and a shelf attached to said tank adjacent to said drawing compartment, the said shelf being covered with granular material engaged by the adjoining wall of said hood and serving to obstruct the flow of heat between said hood wall and said tank.

10. In glass working apparatus, a source of drawing comprising a plurality of adjacently placed units, each embodying a tank and a hood movable relatively to project drawing surfaces, said units being operable to present their drawing surfaces alternately to one workman.

11. In a glass working apparatus, the combination with a supply tank, of duplex drawing tanks adjacent thereto, a connection between the supply tank and the first drawing tank to supply glass to the latter, and a connection between the first and the second drawing tanks to supply glass from the first to the said second tank, said drawing tanks being formed with drawing compartments on opposite sides and arranged to be oppositely and alternately projected for the successive drawing operations.

12. The combination with a hood and a transversely movable tank thereunder having overlapping longitudinal walls limiting the transverse movement of the tank, of a truck adapted to support the movable tank and carry it longitudinally of the hood whereby the tank may be removed from under the hood.

13. In a glass working apparatus, the combination with a tank for molten glass having compartment walls formed therein for dividing the tank into separate drawing compartments, of a movable hood surmounting said tank with provisions permitting lateral shifting of the hood to selectively expose said compartments, said compartment walls extending upwardly within said hood and the outer walls of said hood extending downwardly to abut against their corresponding compartment walls to shut off the flow of heat from within the hood to the exposed drawing compartment when the hood is shifted laterally to such exposing position.

14. In the manufacture of glass, a source of drawing, comprising a tank having drawing compartments in communication therewith, and a hood of smaller area than the combined area of the tank and the drawing compartments, the said hood and tank being relatively reciprocable to alternately expose certain drawing compartments while the tank is covered.

In testimony whereof I affix my signature in the presence of two subscribing witnesses.

ARTHUR E. SPINASSE.

Witnesses:
  HERBERT C. WOOD,
  GEORGIA C. WOOD.